(12) United States Patent
Kim et al.

(10) Patent No.: US 7,715,933 B2
(45) Date of Patent: May 11, 2010

(54) METHOD OF MANAGING LYRIC DATA OF AUDIO DATA RECORDED ON A REWRITABLE RECORDING MEDIUM

(75) Inventors: Hyung Sun Kim, Seoul (KR); Kang Soo Seo, Kyunggi-do (KR); Byung Jin Kim, Kyunggi-do (KR); Soung Hyun Um, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/305,027

(22) Filed: Nov. 27, 2002

(65) Prior Publication Data

US 2003/0099465 A1 May 29, 2003

(30) Foreign Application Priority Data

Nov. 27, 2001 (KR) .................. 10-2001-0074383

(51) Int. Cl.
*G06F 19/00* (2006.01)
*G06F 17/00* (2006.01)

(52) U.S. Cl. .................. 700/94; 434/307 A
(58) Field of Classification Search .................. 700/94; 434/307 A
See application file for complete search history.

(56) References Cited

U.S. PATENT DOCUMENTS

| | | | |
|---|---|---|---|
| 5,119,474 A | | 6/1992 | Beitel et al. |
| 5,127,303 A | * | 7/1992 | Tsumura et al. .................. 84/609 |
| 5,194,682 A | * | 3/1993 | Okamura et al. ......... 434/307 A |
| 5,194,683 A | * | 3/1993 | Tsumura et al. ......... 434/307 A |
| 5,294,892 A | | 3/1994 | Ryat |
| 5,294,982 A | | 3/1994 | Salomon et al. |
| 5,408,686 A | * | 4/1995 | Mankovitz .................. 455/66.1 |
| 5,494,443 A | * | 2/1996 | Nakai et al. ............. 434/307 A |
| 5,499,921 A | | 3/1996 | Sone |
| 5,526,284 A | * | 6/1996 | Mankovitz .................. 455/66.1 |
| 5,583,980 A | | 12/1996 | Anderson |
| 5,649,234 A | * | 7/1997 | Klappert et al. .......... 715/500.1 |
| 5,683,253 A | * | 11/1997 | Park et al. ............... 434/307 A |
| 5,701,511 A | | 12/1997 | Smith |
| 5,705,762 A | * | 1/1998 | Kang et al. .................... 84/610 |
| 5,726,373 A | * | 3/1998 | Choi et al. ..................... 84/609 |
| 5,808,722 A | | 9/1998 | Suzuki |
| 5,854,619 A | | 12/1998 | Kato |
| 5,953,375 A | * | 9/1999 | Nishiwaki et al. ........... 375/259 |
| 5,960,152 A | | 9/1999 | Sawabe et al. |
| 6,006,241 A | | 12/1999 | Purnaveja et al. |
| 6,016,295 A | * | 1/2000 | Endoh et al. ............. 369/47.16 |
| 6,118,608 A | | 9/2000 | Kakihara et al. |

(Continued)

FOREIGN PATENT DOCUMENTS

JP 02-223086 9/1990

(Continued)

*Primary Examiner*—Michael D Masinick
(74) *Attorney, Agent, or Firm*—Birch, Stewart, Kolasch & Birch, LLP (57) ABSTRACT

A recording medium, a method and an apparatus for managing text data and main data are provided. The method includes recording text data in a text data file separate from a file containing main data associated with the text data, recording navigation information that links the main data and the text data, and recording, in the text data file, attribute information associated with the text data.

27 Claims, 6 Drawing Sheets

U.S. PATENT DOCUMENTS

| | | | |
|---|---|---|---|
| 6,172,988 B1 | 1/2001 | Tiernan et al. |
| 6,173,113 B1 | 1/2001 | Okada et al. |
| 6,173,317 B1 | 1/2001 | Chaddha et al. |
| 6,259,858 B1 | 7/2001 | Ando et al. |
| 6,263,330 B1 * | 7/2001 | Bessette ............... 707/4 |
| 6,267,600 B1 | 7/2001 | Song |
| 6,288,990 B1 | 9/2001 | Fujiie et al. |
| 6,414,725 B1 | 7/2002 | Clarin et al. |
| 6,429,364 B1 | 8/2002 | Muraki et al. |
| 6,441,291 B2 | 8/2002 | Hasegawa et al. |
| 6,453,119 B1 | 9/2002 | Maruyama et al. |
| 6,467,061 B2 | 10/2002 | Chung et al. |
| 6,542,694 B2 | 4/2003 | Ando et al. |
| 6,553,182 B2 | 4/2003 | Ando et al. |
| 6,580,873 B2 | 6/2003 | Ando et al. |
| 6,584,152 B2 | 6/2003 | Sporer et al. |
| 6,584,274 B2 | 6/2003 | Ando et al. |
| 6,597,861 B1 | 7/2003 | Tozaki et al. |
| 6,625,388 B2 | 9/2003 | Winter et al. |
| 6,636,238 B1 | 10/2003 | Amir et al. |
| 6,654,543 B2 | 11/2003 | Ando et al. |
| 6,654,863 B2 | 11/2003 | Nishio et al. |
| 6,668,158 B1 | 12/2003 | Tsutsui et al. |
| 6,697,632 B1 | 2/2004 | Sood |
| 6,788,880 B1 | 9/2004 | Fuchigami et al. |
| 6,802,019 B1 | 10/2004 | Lauder et al. |
| 6,979,769 B1 | 12/2005 | Majima et al. |
| 7,092,334 B2 | 8/2006 | Choi et al. |
| 2001/0043525 A1 | 11/2001 | Ito et al. |
| 2002/0005107 A1 | 1/2002 | Kurakake et al. |
| 2002/0006271 A1 | 1/2002 | Winter et al. |
| 2002/0034375 A1 | 3/2002 | Suda |
| 2002/0072047 A1 | 6/2002 | Michelson et al. |
| 2003/0093790 A1 | 5/2003 | Logan et al. |
| 2003/0095482 A1 | 5/2003 | Hung et al. |
| 2003/0095794 A1 | 5/2003 | Chung et al. |
| 2003/0198155 A1 | 10/2003 | Go et al. |

FOREIGN PATENT DOCUMENTS

| | | |
|---|---|---|
| JP | 2001-202755 A | 7/2001 |
| KR | 2001-0024820 | 3/2001 |
| KR | 10-2002-0006620 A | 1/2002 |
| WO | WO-00/26911 | 5/2000 |

* cited by examiner

*to contain lyrics of recorded songs*

FIG. 3

*Real Time Record Audio Management (RTR_AMG)*

| |
|---|
| RTR Audio Manager General Information (RTR_AMGI) |
| Audio File Information Table (AUDFIT) |
| Audio Still Video File Information Table (ASVFIT) |
| Audio Lyric File Information Table (ALFIT) |
| Original PGC Information (ORG_PGCI) |
| User Defined PGC Information Table (UD_PGCIT) |
| Text Data Manager (TXTDT_MG) |
| Manufacture's Information Table (MNFIT) |

Size restricted by 512KBytes

FIG. 4

*Original Program Chain Information (ORG_PGCI)*

| |
|---|
| PGC General Information (PGC_GI) |
| PG Information #1 (PGI #1) |
| ⋮ |
| PG Information #m (PGI #m) |
| CI Search Pointer #1 (CI_SRP #1) |
| ⋮ |
| CI Search Pointer #n (CI_SRP #n) |
| Cell Information #1 (CI #1) |
| ⋮ |
| Cell Information #n (CI #n) |

| Reserved | Reserved |
|---|---|
| C_TY | Cell Type |
| PB_INF | Playback Information |
| AOBI_SRPN | AOBI Search Pointer Number |
| ASVUI_SRPN | ASVUI Search Pointer Number |
| ALUI_SRPN | ALUI Search Pointer Number |
| ASV_DMD | Display Mode of ASV |
| C_EPI_Ns | Number of C_EPIs |
| C_A_S_PTM | Audio Start PTM of this Cell |
| C_A_E_PTM | Audio End PTM of this Cell |

FIG. 5

*Original Progam Chain Information (ORG_PGCI)*

| PGC General Information (PGC_GI) |
|---|
| PG Information #1 (PGI #1) |
| : |
| PG Information #m (PGI #m) |
| CI Search Pointer #1 (CI_SRP #1) |
| : |
| CI Search Pointer #n (CI_SRP #n) |
| Cell Information #1 (CI #1) |
| : |
| Cell Information #n (CI #n) |

| | |
|---|---|
| Reserved | Reserved |
| C_TY | Cell Type |
| PB_INF | Playback Information |
| AOBI_SRPN | AOBI Search Pointer Number |
| ASVUI_SRPN | ASVUI Search Pointer Number |
| ALUI_SRPN_Ns | Number of ALUI_SRPN |
| ALUI_SRPN #1 | ALUI Search Pointer Number #1 |
| : | : |
| ALUI_SRPN # k | ALUI Search Pointer Number # k |
| ASV_DMD | Display Mode of ASV |
| C_EPI_Ns | Number of C_EPIs |
| C_A_S_PTM | Audio Start PTM of this Cell |
| C_A_E_PTM | Audio End PTM of this Cell |

FIG. 6

*Audio Lyric File Information Table (ALFIT)*

| | | | |
|---|---|---|---|
| Audio Lyric FIT Information (ALFITI) | | ALFI_Ns | Number of ALFIs |
| | | AL_I_Ns | Number of AL_Is |
| | | ALFIT_EA | End Address of ALFIT |
| Audio Lyric File Information (ALFI) | ALFI Genaral Information (ALFI_GI) | CHRS | Charater Set |
| | | ALUI_SRP_Ns | Number of ALUI_SRPs |
| | | ALU_MG_EA | End Address of ALU_MG |
| | ALUI Search Pointer #1 (ALUI_SRP #1) | ALU_SA | Start Address of ALU |
| | | ALU_SZ | Size of ALU |
| | | L_ATR | Lyric Attribute |
| | ALUI Search Pointer #2 (ALUI_SRP #2) | ALU_SA | Start Address of ALU |
| | | ALU_SZ | Size of ALU |
| | | L_ATR | Lyric Attribute |
| | ⋮ | ⋮ | ⋮ |
| | ALUI Search Pointer #n (ALUI_SRP #n) | ALUI_SA | Start Address of ALU |
| | | ALUI_SZ | Size of ALU |
| | | L_ATR | Lyric Attribute |

*file 'AR_Lyric.ARO'*

| | |
|---|---|
| ALU #1 | Lyric Text |
| ALU #2 | Lyric Text |
| ⋮ | ⋮ |
| ALU #n | Lyric Text |

FIG. 7

*Audio Lyric File Information Table (ALFIT)*

| | | | |
|---|---|---|---|
| Audio Lyric FIT Information (ALFITI) | | ALFI_Ns | Number of ALFIs |
| | | AL_I_Ns | Number of AL_Is |
| | | ALFIT_EA | End Address of ALFIT |
| Audio Lyric File Information (ALFI) | ALFI Genaral Information (ALFI_GI) | CHRS | Charater Set |
| | | ALUI_SRP_Ns | Number of ALUI_SRPs |
| | | ALU_MG_EA | End Address of ALU_MG |
| | ALUI Search Pointer #1 (ALUI_SRP #1) | ALU_SA | Start Address of ALU |
| | | ALU_SZ | Size of ALU |
| | ALUI Search Pointer #2 (ALUI_SRP #2) | ALU_SA | Start Address of ALU |
| | | ALU_SZ | Size of ALU |
| | ⋮ | ⋮ | ⋮ |
| | ALUI Search Pointer #n (ALUI_SRP #n) | ALUI_SA | Start Address of ALU |
| | | ALUI_SZ | Size of ALU |

*file 'AR_Lyric.ARO'*

| ALU #1 | Lyric Text | Lyric Attribute |
|---|---|---|
| ALU #2 | Lyric Text | Lyric Attribute |
| ⋮ | ⋮ | ⋮ |
| ALU #n | Lyric Text | Lyric Attribute |

Original Progam Chain Information
(ORG_PGCI)

| Program General Information (PGC_GI) |
| --- |
| PG Information #1 (PGI #1) |
| ⋮ |
| PG Information #m (PGI #m) |
| CI Search Pointer #1 (CI_SRP #1) |
| ⋮ |
| CI Search Pointer #n (CI_SRP #n) |
| Cell Information #1 (CI #1) |
| ⋮ |
| Cell Information #n (CI #n) |

| ⋮ | ⋮ |
| --- | --- |
| PG_TY | PG Type |
| ⋮ | ⋮ |
| ALUI_SRPN | ALUI Search Pointer Number |
| ⋮ | ⋮ |

METHOD OF MANAGING LYRIC DATA OF AUDIO DATA RECORDED ON A REWRITABLE RECORDING MEDIUM

BACKGROUND OF THE INVENTION

1. Field of the Invention

The present invention relates to a data managing method that records lyrics associated with recorded audio data in a file separated from audio data management information called RTR_AMG (Real Time Record Audio Management) allocated in a rewritable recording medium, and that searches for a lyric unit written in the separate file prior to reproducing the recorded audio data.

2. Description of the Related Art

A disk-type recording medium such as a Compact Disk (CD) can store high-quality digital audio data permanently, so that it is very popular recording medium in these days.

Recently, a Digital Versatile Disk (called 'DVD' hereinafter) has been developed as a new disk-type recording medium. A DVD can store much larger size than a CD, that is, high-quality moving pictures or audio data are recorded in a DVD for much longer time. Therefore, a DVD will be used widely in the near future.

There are three types in a DVD, DVD-ROM for read-only, DVD-R for write-once, and DVD-RAM or DVD-RW for rewritable. For a rewritable DVD, the standardization of data writing format is in progress.

Figure 1:
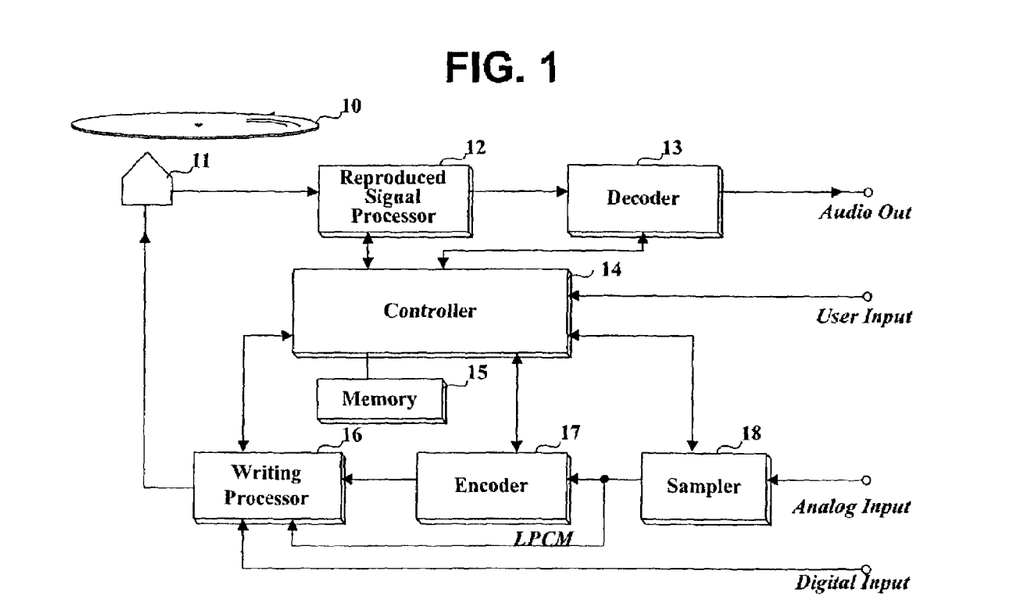
FIG. 1 is a block diagram of an optical disk device that records/reproduces audio data to/from a recording medium.

FIG. 1 is a block diagram of an optical disk device that records/reproduces audio data to/from a recording medium.

The disk device configured as FIG. 1 comprises an optical pickup 11 reading signals recorded in a rewritable DVD 10 such as a DVD-RW and writing data streams processed into writable signals onto the rewritable DVD 10; a reproduced signal processor 12 restoring the read signals into compressed digital data; a decoder 13 decoding the compressed digital data to original data; a sampler 18 digitizing an inputted analog signal at a preset sampling rate; an encoder 17 encoding the digitized LPCM data into MPEG-, or AC3-formatted data; a writing processor 16 converting the encoded data from the encoder 17 or LPCM data from the sampler 18 into signals suitable to be written; a controller 14 controlling all elements to conduct user's command such as playback or record; and a memory 15 for storing data temporally.

If an analog signal is applied to the disk device of FIG. 1, the sampler 18 samples the analog signal at the preset sampling rate. Each sampled signal, which is LPCM data, is applied to the encoder 17 that encodes a block of sampled data into compressed data of pre-specified format, for example, MPEG format. The compressed data are then applied to the writing processor 16.

The writing processor 16 converts a series of the compressed data into binary signals which are written in mark/space patterns on the writable DVD 10. Already-compressed digital data from outside are directly processed by the writing processor 16 to be written onto the writable DVD 10.

After recording of audio data, navigation data for them are created and then recorded the writable DVD 10.

Figure 2:
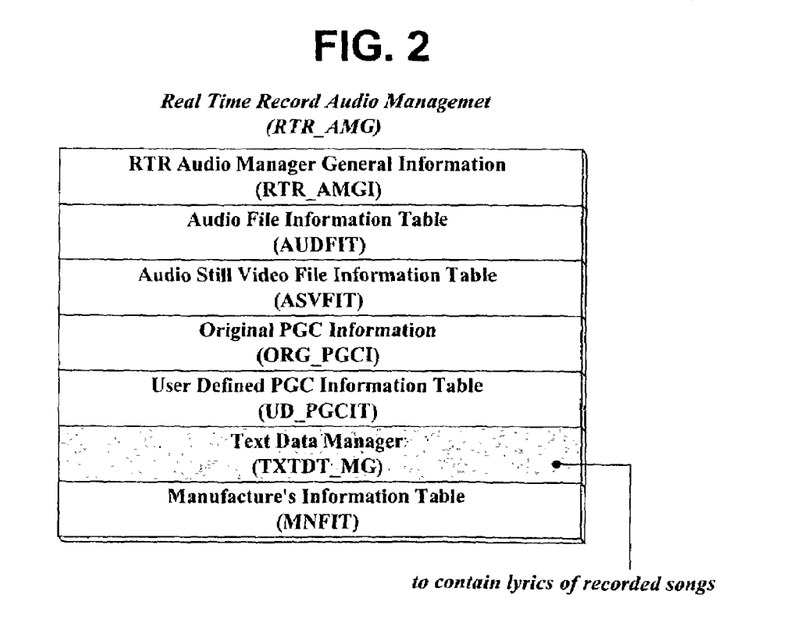
FIG. 2 shows the structure of RTR_AMG (Real Time Record Audio ManaGement) recorded as navigation data on a rewritable disk.

FIG. 2 shows the structure of RTR_AMG (Real Time Record Audio ManaGement) recorded as navigation data on a rewritable disk. The RTR_AMG includes RTR_AMGI (RTR Audio Manager General Information), AUDFIT (AUDio File Information Table), ASVFIT (Audio Still Video File Information Table), ORG_PGCI (ORiGinal PGC (ProGram Chain) Information), UD_PGCIT (User Defined PGC Information Table), TXTDT_MG (TeXT DaTa ManaGer), and MNFIT (MaNufacturer's Information Table).

The TXTDT_MG can include lyrics of recorded songs. Therefore, when the controller 14 selects and reproduces a recorded song from the rewritable disk 10, it is able to present lyric text in characters on a screen by reading it from the TXTDT_MG.

Consequently, when a user selects a recorded song to play back from the rewritable DVD 10, he or she is able to view its lyric on a screen.

By the way, the size of RTR_AMG including the TXTDT_MG may be restricted below a certain limit, e.g., 512 KBytes for the purpose of saving resources of a disk player. Furthermore, because an MP3 audio file, which is relatively small in size by lossy coding, is about 2~4 Mbytes in size, a DVD-RW of about 4.7 GBytes in storage capacity is able to store more than about 1,000 MP3 audio files. Thus, if all lyrics of such many recorded MP3 audio files were written in the TXTDT_MG, the size of RTR_AMG including TXTDT_MG would exceed by far the size limitation.

SUMMARY OF THE INVENTION

It is an object of the present invention to provide a data managing method that records lyrics associated with recorded audio data in a file separated from RTR_AMG allocated in a rewritable recording medium and records search information in the RTR_AMG to refer to respective lyrics in the separate file in order that a lyric may be easily found prior to reproducing corresponding audio data.

It is another object of the present invention to provide another data managing method that reproduces audio data and lyric data in the separate file that are pointed by the search information in RTR_AMG.

A method of managing lyrics for audio data recorded on a rewritable disk in accordance with the present invention records lyric data of audio data recorded on a rewritable recording medium in a file separated from management information for the recorded audio data, and records in the management information search information to point to respective lyric data of the recorded audio data.

A method of reading lyrics for audio data recorded on a rewritable disk in accordance with the present invention reads management information for reproduction control of recorded audio data, and searches a file, separated from the management information, for lyric data based on the read management information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, a preferred embodiment thereof will now be described with reference to the accompanying drawings.

In an audio data recording method in accordance with the present invention, after small-sized audio data such as an MP3 audio file, which is relatively small in size by lossy coding, is recorded onto a rewritable disk of large capacity, a lyric related with a recorded song is recorded in a specific file named, e.g., 'AR_Lyric.ARO' that is separated from a management information file, namely, RTR_AMG file. Then, search information to point to respective lyrics in the separate file is recorded in the RTR_AMG.

Figure 3:
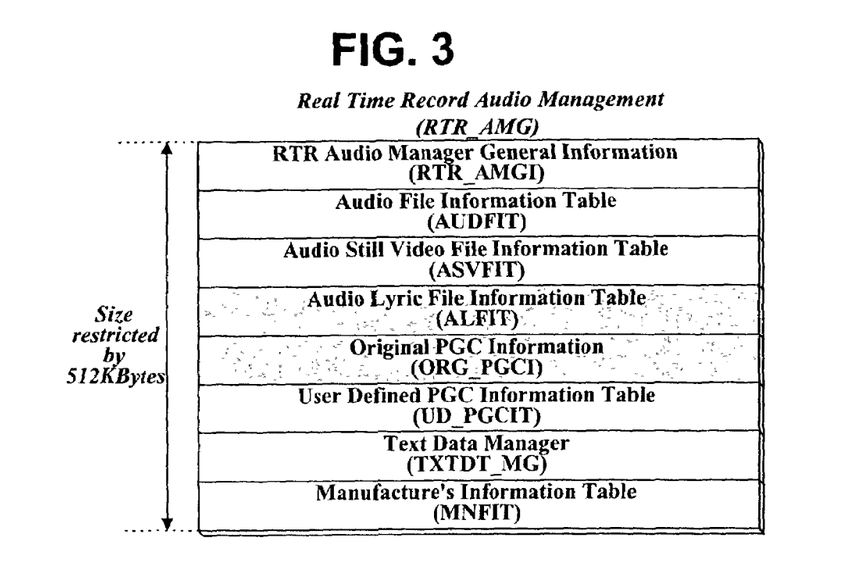
FIG. 3 shows an RTR_AMG including an ALFIT (Audio Lyric File Information Table) according to an embodiment of the present invention.

FIG. 3 shows an RTR_AMG including an ALFIT (Audio Lyric File Information Table) according to an embodiment of the present invention.

The RTR_AMG of FIG. 3 includes RTR_AMGI, ASVFIT, ORG_PGCI, UD_PGCIT, TXTDT_MG, and MNFIT the same as FIG. 2. However, the RTR_AMG further includes an ALFIT.

Figure 4:
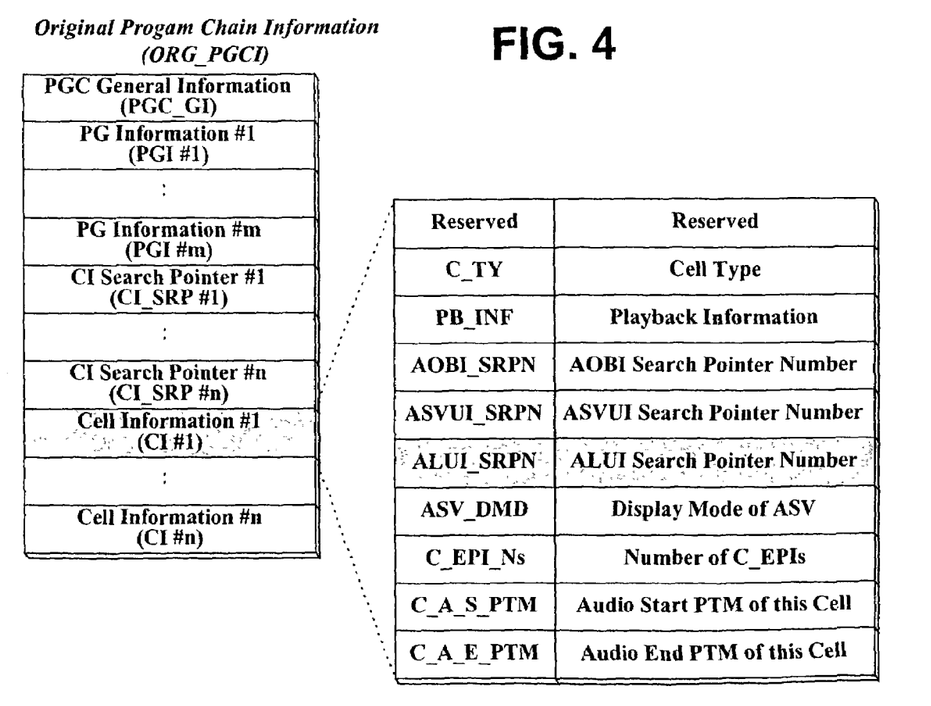
FIG. 4 shows cell information including an audio lyric unit search pointer number according to an embodiment of the present invention.

The ORG_PGCI is composed of PGC_GI (PGC General Information), plural pieces of PGI 'PGI #1~#m', a plurality of CI_SRPs (Cell Information SeaRch Pointers), and plural pieces of CI (Cell Information) 'CI #1~#n', as shown in FIG. 4. Each CI includes cell type information 'C_TY', playback information 'PB_INF', an AOBI_SRPN (AOB Information SeaRch Pointer Number) for indexing information location of a related AOB (or an MP3-formatted song), an ASVUI_S-RPN (ASVU (Audio Still Video Unit) Information SeaRch Pointer Number) for indexing information location of still video data linked with an AOB, and an ALUI search pointer number 'ALUI_SRPN' for indexing a corresponding ALUI search pointer among pointers in the ALFIT.

The ALUI search pointer number 'ALUI_SRPN' is indicative of an index number of an ALU (Audio Lyric Unit) search pointer in the ALFIT that has location information of an ALU written in the separate file 'AR_Lyric.ARO'

Figure 5:
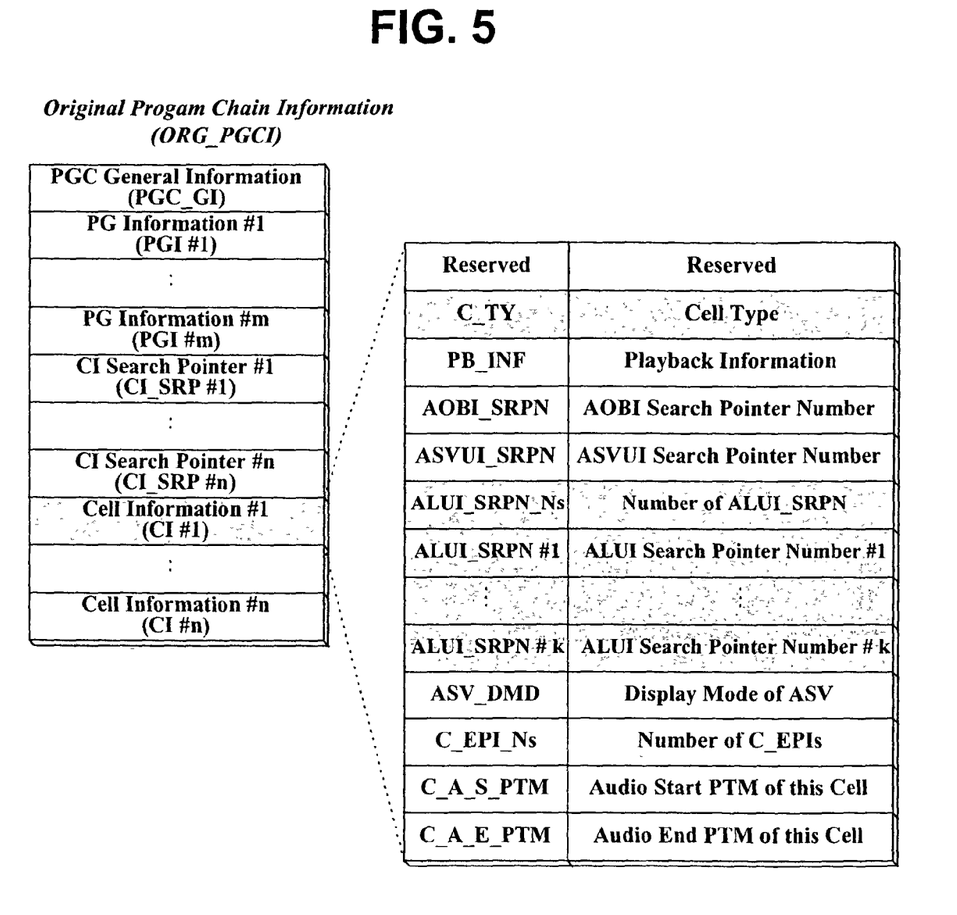
FIG. 5 shows cell information including an audio lyric unit search pointer number and the number of the search pointer numbers according to another embodiment of the present invention.

The CI may be structured differently. FIG. 5 shows another structure of CI. The CI of FIG. 5 is to accommodate plural ALUI search pointer numbers. This is useful for writing several lyric languages for a single song. An ALU allocated in the file 'AR_Lyric.ARO' can contain user data entered by user inputs, instead of lyric text of an associated song.

If CI is related with an EMD (Electronic Music Distribution) data file of which data are uniquely formatted, the cell type 'C_TY' identifies that an EMD file is related. In this case, the CI includes no information related with lyric such as the fields 'ALUI_SRPN'.

Figure 6:
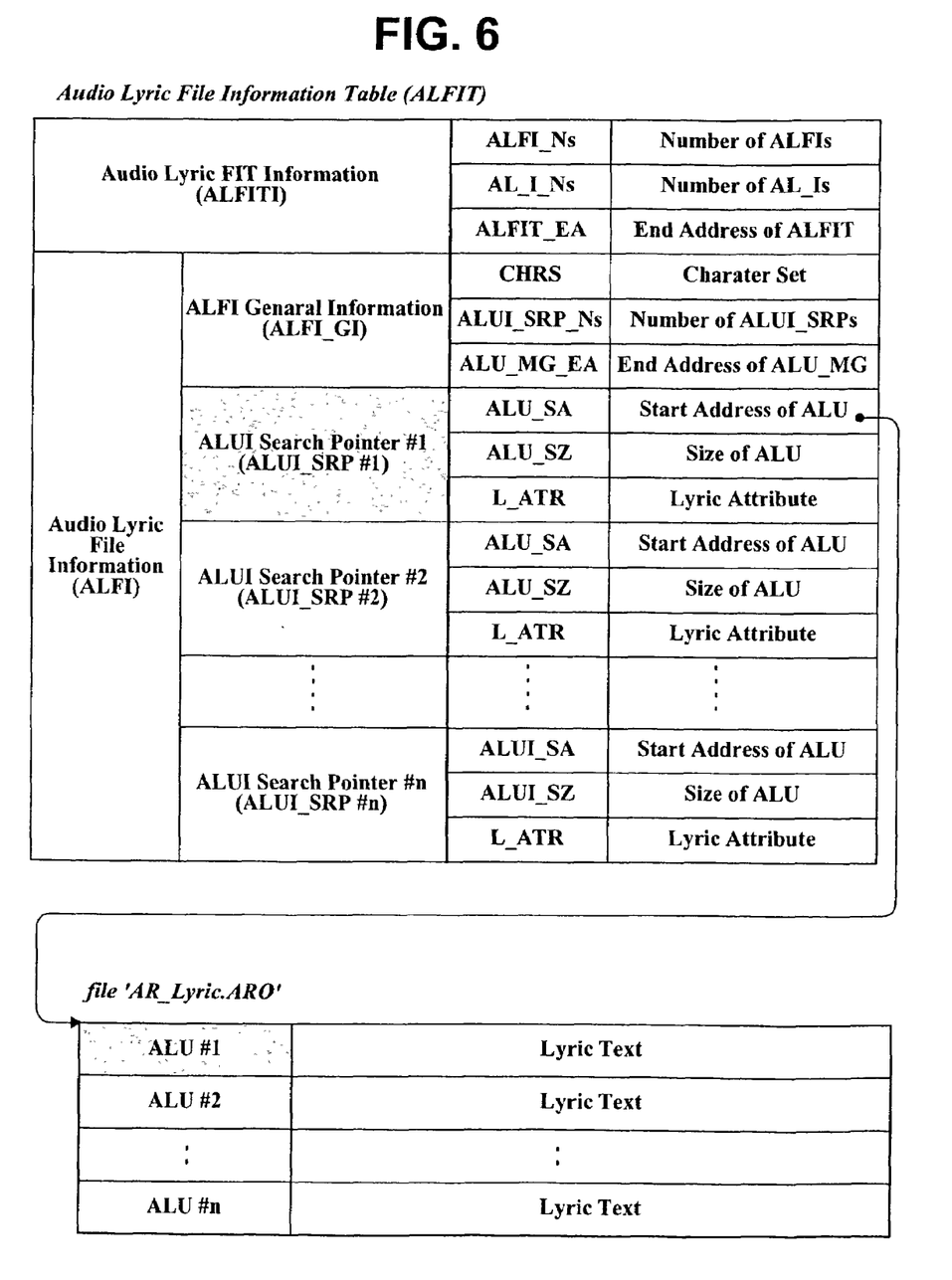
FIG. 6 shows a structure of an ALFIT in RTR_AMG including information to point to individual audio lyric units in an audio lyric file.

FIG. 6 shows the structure of the ALFIT in RTR_AMG. The ALUI_SRPN in CI indexes an ALU search pointer in the ALFIT, as aforementioned.

The ALFIT is composed of ALFITI (ALFIT Information) and ALFI. The ALFITI includes fields of 'ALFI_Ns' reserved for the number of audio lyric information files, 'AL_I_Ns' for the number of pieces of audio lyric information, and 'ALFIT_EA' for an end address of ALFIT.

The ALFI is composed of ALFI_GI (ALFI General Information) and a plurality of ALUI (Audio Lyric Unit Information) search pointers, each includes 'ALU_SA' for a start address of a lyric unit, 'ALU_SZ' for size of a lyric unit, and 'L_ATR' for attribute of a lyric text.

The ALU_SA in each ALUI search pointer points to location of a corresponding ALU (Audio Lyric Unit) in the specific file 'AR_Lyric.ARO' that is separated from the RTR_AMG, as shown in FIG. 6. Each ALU in the file 'AR_Lyric.ARO' includes a lyric text associated with a single recorded song.

Thus, if a song, namely, an AOB is chosen, a disk player reads the number written in ALUI_SPRN of CI associated with the selected AOB, and specifies an ALUI search pointer contained in the field 'ALFI' by the read number. The location of a lyric unit related with the selected song is found in the file 'AR_Lyric.ARO' by location address in the specified pointer. Therefore, lyric text can be presented along with reproduced audio data.

Figure 7:
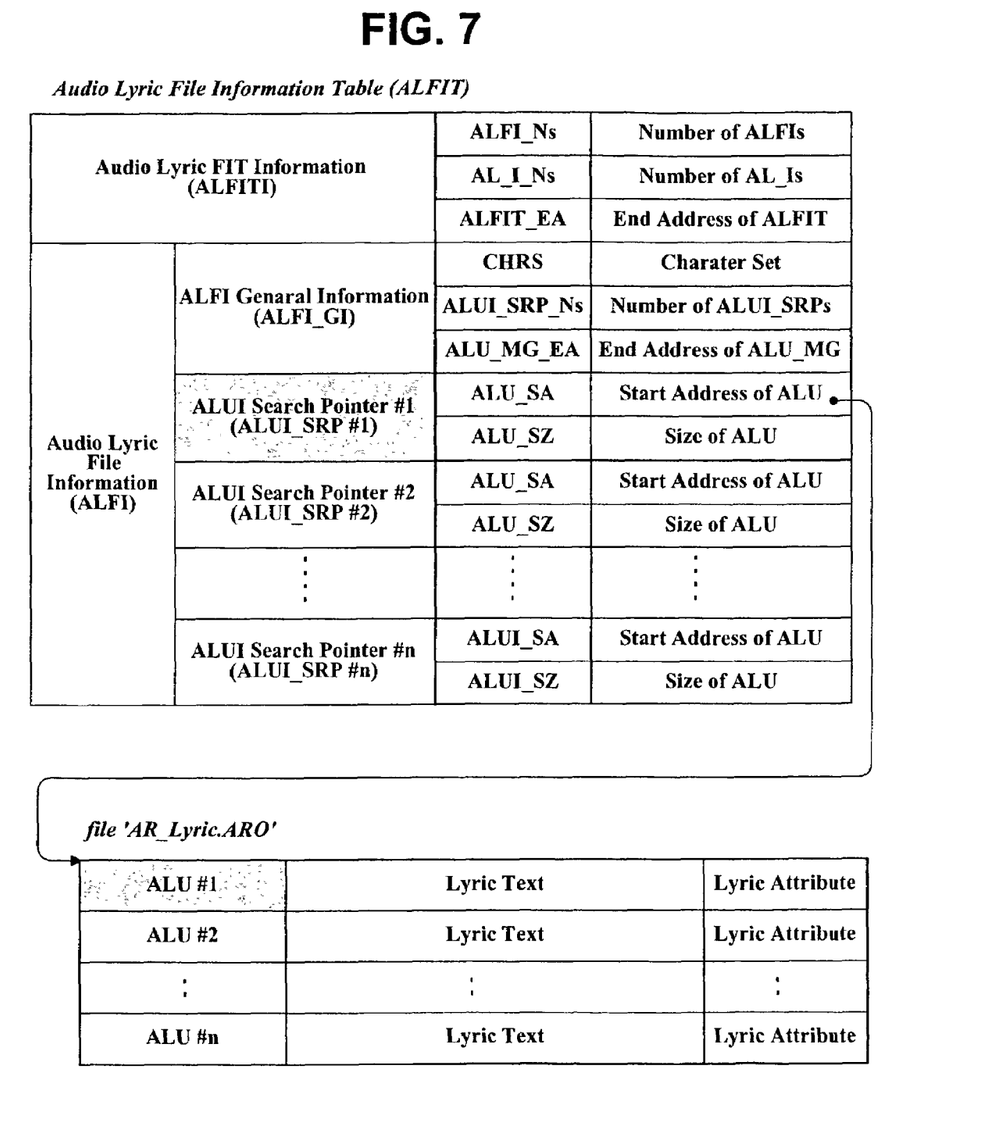
FIG. 7 shows another structure of an ALFIT in RTR_AMG including information to point to individual audio lyric units in an audio lyric file.

The disk player may process the read lyric text based on the lyric attribute written in the field 'L_ATR' of the current ALUI search pointer. In other words, if the attribute is indicative of a certain language, the disk player converts the lyric text written in the lyric unit to characters of corresponding language font. The lyric attribute field can be allocated in a lyric unit in the file 'AR_Lyric.ARO' instead of in the ALFIT, as shown in FIG. 7.

Under the condition that RTR_AMG and the lyric file 'AR_Lyric.ARO' are constructed as described above, a lyric related with a selected song, namely, audio data is found through the search information in RTR_AMG as follows and then presented along with the selected audio data.

Figure 8:
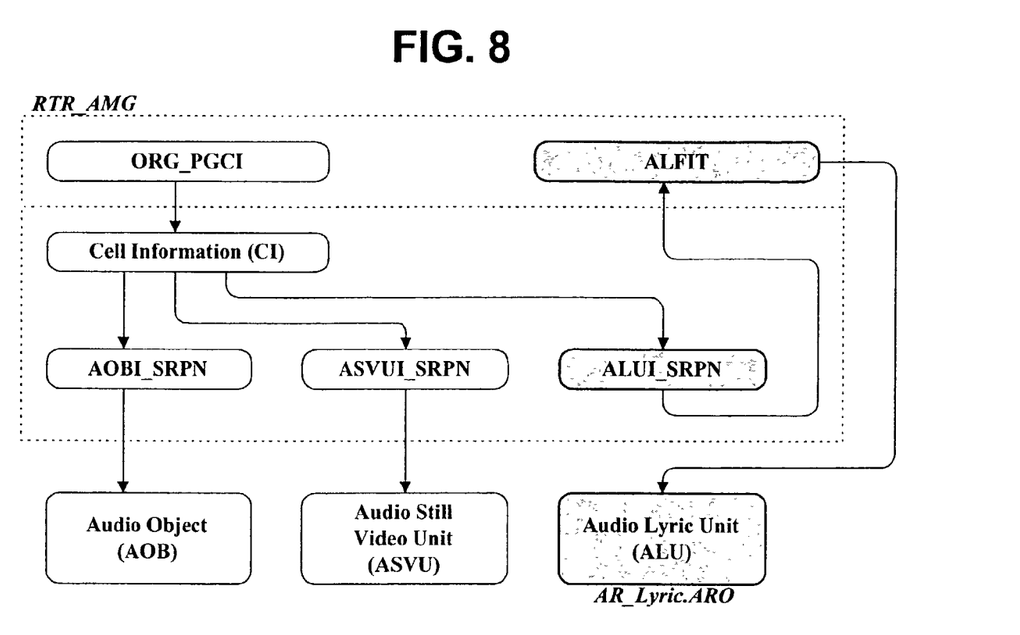
FIG. 8 shows a schematic procedure to find an audio lyric unit related with a selected song.

FIG. 8 shows a schematic procedure to find an ALU related with a selected song.

The controller 14 of the disk device of FIG. 1 searches the ORG_PGC of RTR_AMG for a piece of PGI and/or a piece of CI that is associated with a recorded song selected by a user. If a user selects a program chain including a plurality of recorded songs, the controller 14 searches the ORG_PGI for a piece of PGI and/or CI associated with the first song of them.

Further, the controller 14 checks the field 'C_TY' in the found CI to know whether the associated audio data have been encoded to special EMD format.

If not EMD-formatted, the controller 14 reads the numbers written in AOBI_SRPN and ASVUI_SRPN of CI associated with the selected AOB, namely, song, and reproduces recorded audio data indexed by the number in AOBI_SRPN and still video unit indexed by the number in ASVUI_SRPN. The still video unit is presented in a series of still pictures.

At the same time, the controller 14 reads the number written in ALUI_SRPN of that CI, and then specifies an ALUI search pointer contained in the 'ALFIT' of RTR_AMG by the read number. The controller 14 examines three fields 'ALU_SA', 'ALU_SZ', and 'L_ATR' included in the specified ALUI search pointer.

The location of a lyric unit related with the selected song is found in the file 'AR_Lyric.ARO' by the address written in the 'ALU_SA'. Lyric text is read into the memory 15 from that location as size as the 'ALU_SZ' specifies. The read text is processed to an adequate language based on lyric attribute defined by the field 'L_ATR'. Consequently, the processed lyric is presented onto a screen during playback of the selected audio data.

If the lyric attribute is allocated in a lyric unit as shown in FIG. 7, the controller 14 processes the lyric text based on the lyric attribute written therein to present into adequate language.

If a plurality of ALUI search pointer numbers have been recorded in a single piece of CI, the controller 14 selects only one ALUI_SRPN among them based on user's selection or selects them sequentially. In latter case, lyric units are sequentially presented in the same sequence that the ALUI search pointer numbers are placed.

If the cell type is indicative of EMD format, the controller 14 executes a decoding algorithm suitable for that format to play back the selected song.

Figure 9:
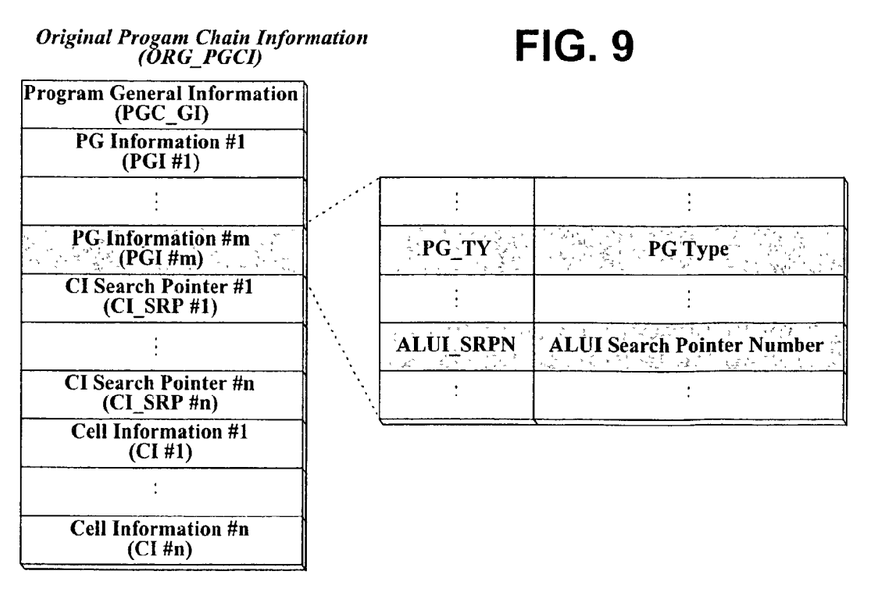
FIG. 9 shows program information including an audio lyric unit search pointer number according to another embodiment of the present invention.

The type field indicating type of audio data and the number field 'ALUI_SRPN' can be allocated in PGI instead of in CI, as shown in FIG. 9, because a piece of PGI is also assigned to a single program, namely, AOB. In this case, type field allocated in PGI is called program type 'PG_TY'.

The above-explained lyric data managing method for a rewritable disk of large storage capacity can accommodate the entire lyrics of many small-sized songs recorded on a rewritable disk without any increment of the size of RTR_AMG over a given size limitation. Consequently, the system requirement of a disk device is alleviated to manage recorded audio data.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of recording text sub data, comprising:
    recording a main data on a recording medium;
    recording text data including a plurality of individual text sub data units to be presented with the main data on the recording medium, the text sub data units being separated from the main data; and
    recording a navigation information file including navigation information for accessing the main data and linking information that links the main data and the text sub data units, the navigation information file being separated from the text sub data units,
    wherein the navigation information file includes a language information field specifying a language code of the text sub data units,
    wherein the plurality of text sub data units is preloaded into a memory and one of the plurality of text sub data units is displayed with the main data,
    wherein the navigation information file includes an index number of the text sub data units,
    wherein the navigation information file includes coding information for the main data and affecting the text data,
    wherein the plurality of text sub data units is preloaded into the memory before starting presenting with the main data and processed based on attribute information which includes language information regarding a font of the text sub data units, and
    wherein the text data is processed based on the coding information.

2. The method of claim 1, wherein the attribute information for a corresponding text sub data unit further includes information used for presentation of the main data.

3. The method of claim 1, wherein the recording medium is an optical disc.

4. The method of claim 1, wherein the main data includes audio data.

5. The method of claim 1, wherein the navigation information includes an indicator of one of the text sub data units for linking and information for presenting the main data.

6. The method of claim 1, wherein the main data is main audio data, the plurality of text sub data units includes lyrics associated with the main audio data such that upon selection of the main audio data, the lyrics for the selected main audio data are displayed on a screen in correspondence with the selected main audio data, and
    wherein the text sub data units are at a location on the recording medium identified by the linking information and that is different than a location of the navigation information file.

7. The method of claim 1, wherein if the coding information is related with an Electronic Music Distribution (EMD) file, the coding information does not include text data related information, and if the coding information is not related with the EMD file, the text data is processed based on the coding information.

8. A recording medium comprising:
    a plurality of text sub data units included in text data to be presented with main data and recorded separately from the main data, the plurality of text sub data units being preloaded into a memory before presented and the preloaded text sub data units being processed based on attribute information which includes language information regarding a font of the text sub data units; and
    a navigation information file including navigation information for accessing the main data and including linking information that links the main data and the text sub data units, the navigation information file being separated from the text sub data units,
    wherein the navigation information file further includes language information specifying a language code of the text sub data units, and an index number of said text sub data units and,
    wherein the navigation information file further includes coding information for the main data and affecting the text data, and
    wherein the text data is processed based on the coding information.

9. The recording medium of claim 8, wherein the recording medium is an optical disc.

10. The recording medium of claim 8, wherein the main data includes audio data.

11. The recording medium of claim 8, wherein the navigation information includes an indicator of one of the text sub data units for linking and information for presenting the main data.

12. The recording medium of claim 8, wherein the main data is main audio data, the plurality of text sub data units include lyrics associated with the main audio data such that upon selection of the main audio data, the lyrics for the selected main audio data are displayed on a screen in correspondence with the selected main audio data, and wherein the text sub data units are at a location on the recording medium identified by the linking information and that is different than a location of the navigation information file.

13. The recording medium of claim 8, wherein if the coding information is related with an Electronic Music Distribution (EMD) file, the coding information does not include text data related information, and if the coding information is not related with the EMD file, the text data is processed based on the coding information.

14. An apparatus for recording text sub data, comprising:
a pickup configured to record data;
a controller configured to control the pickup to record a main data on a recording medium; to record a plurality of individual text sub data units included in text data to be presented with the main data on the recording medium, the text sub data units being separated from the main data; to record a navigation information file including navigation information for accessing the main data and linking information that links the main data and the text sub data units, the navigation information file being separated from the text sub data units,
wherein the navigation information file includes a language information field specifying a language code of the text sub data units,
wherein one of the plurality of text sub data units is displayed with the main data,
wherein the navigation information file includes an index number of said text sub data units,
wherein the navigation information file includes coding information for the main data and affecting the text data,
wherein the plurality of text sub data units is preloaded into a memory before starting presenting with the main data and processed based on attribute information which includes language information regarding a font of the text sub data units, and
wherein the controller is further configured to process the text data based on the coding information.

15. The apparatus of claim 14, wherein the controller is configured to control the pickup to record the text sub data unit including the attribute information which includes information used for presentation of the main data.

16. The apparatus of claim 14, wherein the recording medium is an optical disc.

17. The apparatus of claim 14, wherein the controller is configured to control the pickup to record the main data which includes audio data.

18. The apparatus of claim 14, wherein the controller is configured to control the pickup to record the main data being main audio data, the plurality of text sub data units including lyrics associated with the main audio data such that upon selection of the main audio data, the lyrics for the selected main audio data being displayed on a screen in correspondence with the selected main audio data, and
wherein the text sub data units are at a location on the recording medium identified by the linking information and that is different than a location of the navigation information file.

19. The apparatus of claim 13, wherein if the coding information is related with an Electronic Music Distribution (EMD) file, the coding information does not include text data related information, and if the coding information is not related with the EMD file, the text data is processed based on the coding information.

20. A method for reproducing text sub data, comprising:
preloading a plurality of text sub data units included in text data into a memory;
processing the preloaded text sub data units based on attribute information which includes language information regarding a font of the text sub data units; and
presenting the processed text sub data units with main data, the text sub data units recorded separately from the main data, presenting a navigation information file including the navigation information for accessing the main data and linking information for linking the text sub data units with the main data, the navigation information file being separated from the text sub data units,
wherein the navigation information file includes a language information field specifying a language code of the text sub data units,
wherein the navigation information file includes an index number of the text sub data units and coding information for the main data and affecting the text data, and
wherein the text data is processed based on the coding information.

21. The method of claim 20, wherein the processing step further comprises converting data of the text sub data units to characters of a corresponding language font.

22. The method of claim 21, wherein the main data is main audio data, the plurality of text sub data units include lyrics associated with the main audio data such that upon selection of the main audio data, the lyrics for the selected main audio data are displayed on a screen in correspondence with the selected main audio data, and
wherein the text sub data units are at a location on the recording medium identified by the linking information and that is different than a location of the navigation information file.

23. The method of claim 20, wherein if the coding information is related with an Electronic Music Distribution (EMD) file, the coding information does not include text data related information, and if the coding information is not related with the EMD file, the text data is processed based on the coding information.

24. An apparatus for reproducing data on a recording medium, comprising:
a memory configured to preload a plurality of text sub data units included in text data;
a processor configured to process the preloaded text sub data units based on attribute information which includes language information regarding a font of the text sub data units; and
a controller, coupled to the processor, configured to present the processed text sub data units with main data, the text sub data units being recorded separately from the main data, according to navigation information included in a navigation information file, said navigation information file including the navigation information for accessing the main data and linking information for linking the text sub data units with the main data, the navigation information file being separated from the text sub data units,
wherein the navigation information file includes a language information field specifying a language code of the text sub data units,
wherein the navigation information file includes a number of said text sub data units and coding information for the main data and affecting the text data, and
wherein the controller is further configured to process the text data based on the coding information.

25. The apparatus of claim 24, wherein the processor is further configured to convert data of the text sub data units to characters of a corresponding language font.

26. The apparatus of claim 25, wherein the controller is further configured to present the main data being main audio data, the plurality of text sub data units including lyrics associated with the main audio data such that upon selection of the main audio data, the lyrics for the selected main audio data are displayed on a screen in correspondence with the selected main audio data, and     wherein the text sub data units are at a location on the recording medium identified by the linking information.

27. The apparatus of claim 24, wherein if the coding information is related with an Electronic Music Distribution (EMD) file, the coding information does not include text data related information, and if the coding information is not related with the EMD file, the text data is processed based on the coding information.

\* \* \* \* \*